(12) United States Patent
Miura

(10) Patent No.: US 6,354,943 B1
(45) Date of Patent: Mar. 12, 2002

(54) GAME SYSTEM AND INFORMATION STORAGE MEDIUM

(75) Inventor: Katsuhiro Miura, Ichikawa (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/581,936

(22) PCT Filed: Oct. 26, 1999

(86) PCT No.: PCT/JP99/05901

§ 371 Date: Jul. 31, 2000

§ 102(e) Date: Jul. 31, 2000

(30) Foreign Application Priority Data

Oct. 30, 1998 (JP) ............................................. 10-326139

(51) Int. Cl.⁷ ................................................ A63F 13/00
(52) U.S. Cl. ........................................... 463/29; 463/43
(58) Field of Search ......................... 463/1, 16, 23–25, 463/29, 40–43; 700/91–93

(56) References Cited

U.S. PATENT DOCUMENTS

| | | | | |
|---|---|---|---|---|
| 5,083,271 A | * | 1/1992 | Thacher | 700/92 |
| 5,287,269 A | * | 2/1994 | Dorrough et al. | 700/91 |
| 5,429,361 A | * | 7/1995 | Raven et al. | 463/29 |
| 5,496,032 A | * | 3/1996 | Okada | 273/138 |
| 5,959,596 A | * | 9/1999 | McCarten et al. | 463/42 |
| 6,219,836 B1 | * | 4/2001 | Wells et al. | 463/25 |
| 6,254,483 B1 | * | 7/2001 | Acres | 463/26 |

FOREIGN PATENT DOCUMENTS

| | | |
|---|---|---|
| JP | A-6-259444 | 9/1994 |
| JP | U-7-27678 | 5/1995 |
| JP | A-7-163756 | 6/1995 |

* cited by examiner

Primary Examiner—Jessica J. Harrison
Assistant Examiner—John M Hotaling, II
(74) Attorney, Agent, or Firm—Oliff & Berridge, PLC

(57) ABSTRACT

An objective is to provide a game system and information storage medium which can improve the operating rate of a game center and realize a more effective management therein. The game system includes a host machine and a plurality of game machines. The host machine is designed to detect the current time or date and to perform allocation of games to the game machines G1 to G9 based on the detected time or date. Transfer data for a player to play a game by means of each of the game machines is then transferred to each of the game machines according to the allocation. A manager of the game center sets schedule data representing how the allocation is carried out according to the time or date. The allocation of games to the game machines may depend on time periods, date or a traffic line of players. Adult games may be set to be played only in the nighttime. Game sound volume and screen brightness may be changed and set based on the time or date.

26 Claims, 9 Drawing Sheets

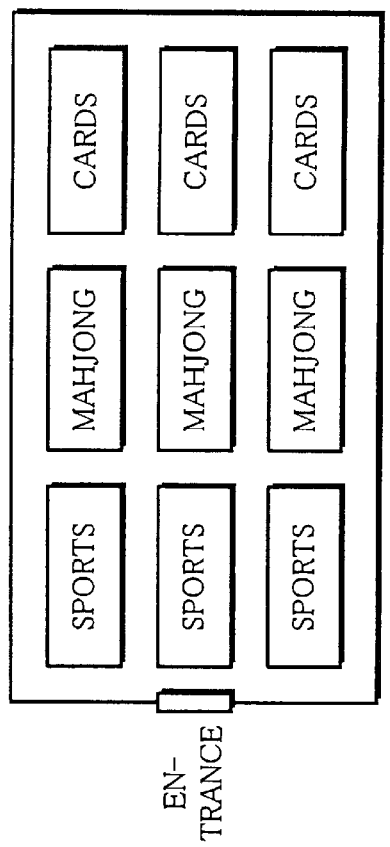
FIG. 4A  DAYTIME
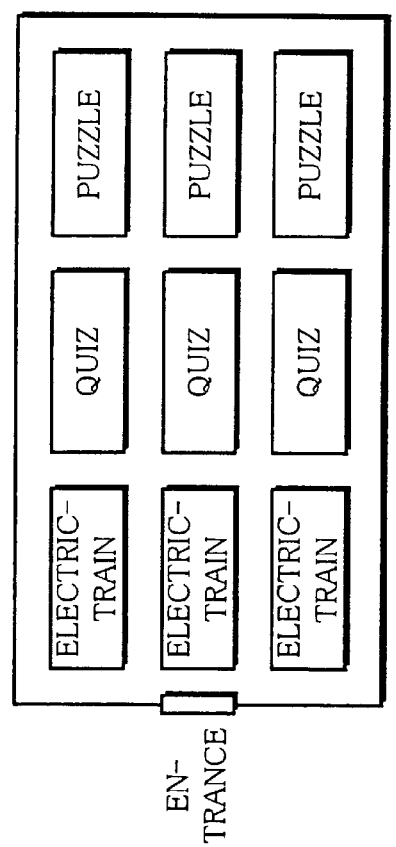
FIG. 4B  NIGHTTIME
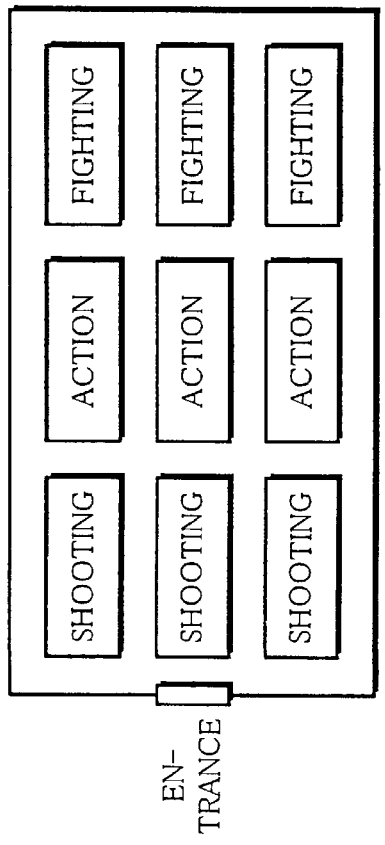
FIG. 4C  WEEKDAY
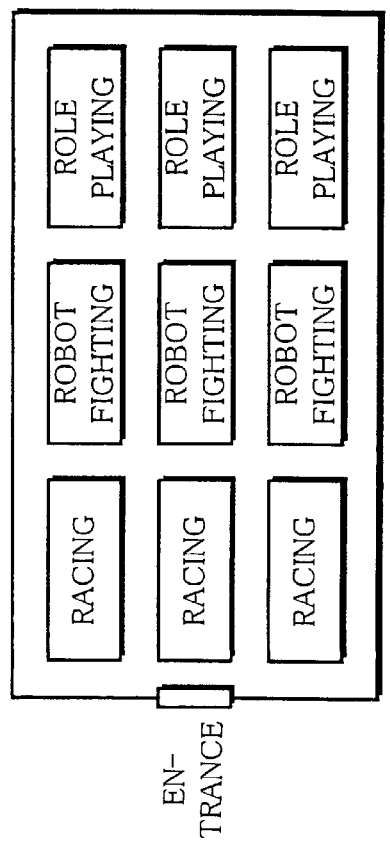
FIG. 4D  HOLIDAY

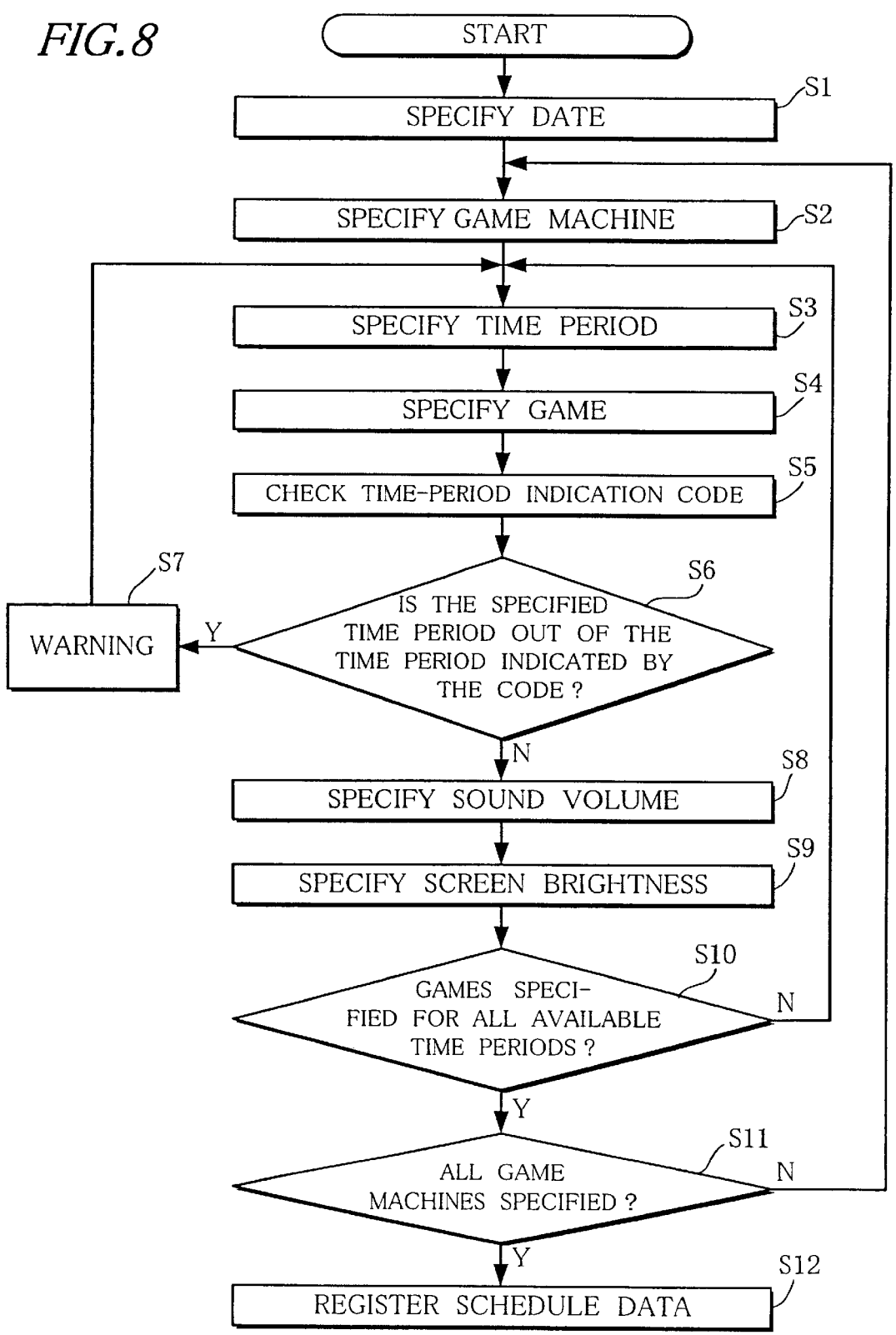

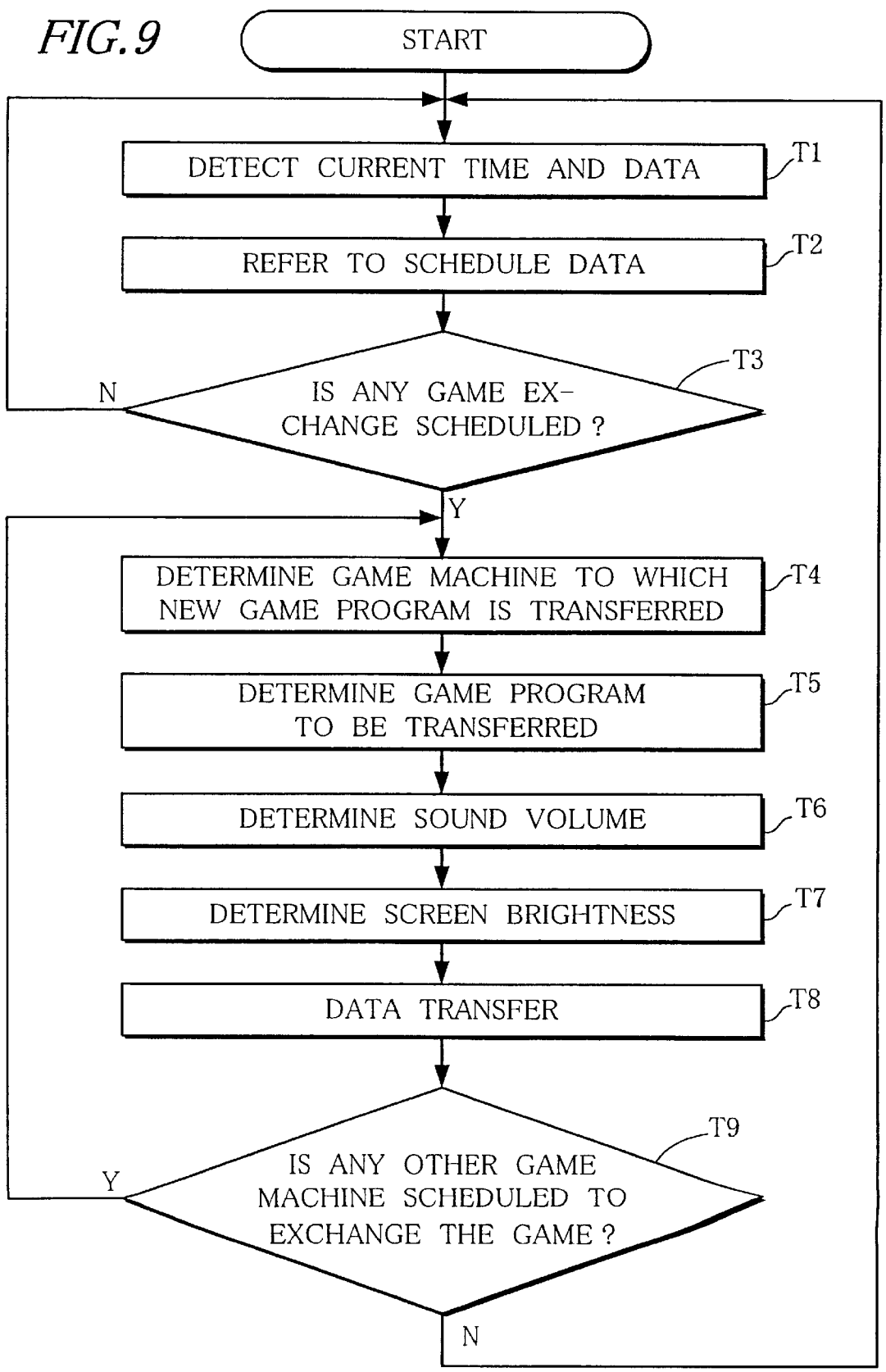

GAME SYSTEM AND INFORMATION STORAGE MEDIUM

TECHNICAL FIELD

The present invention relates to a game system comprising a host machine and a plurality of game machines and an information storage medium usable in said game system.

BACKGROUND ART

There is known a game machine which is placed in a game center in which a player enjoys a game by manipulating an operating section while viewing a game screen outputted from a display section. Such a game machine is called an arcade type game machine and is mainly dedicated only for a single game.

When such a dedicated game machine is to be used, the game center must provide a plurality of dedicated game machines one for each single game. In order to increase the operating rate in the game center, unpopular game machines must be replaced by latest game machines, based on the popularity of game.

One technique for overcoming such a problem is disclosed, for example, in Japanese Patent Laid-Open Application No. Hei 7-163756. According to such a technique, a plurality of general-purpose game machines in each of which a player can execute any desired one of various game programs. The game programs are concentrically managed by the host machine. The host machine collects the operating rate data from each of the game machines and determines a game machine to receive a game program based on the collected operating rate data. More particularly, the host machine judges whether or not there is an empty game machine. If it is determined that there is an empty game machine, the host machine transfers a game program selected based on the managing data to that empty game machine. According to this prior art, the host machine can automatically control a game machine to which a game program is to be transferred, even though the game machine does not require the transfer of game program. Thus, the operating rate in the game center can be improved.

However, this prior art does not completely consider the importance of game machine arrangement in the game center influencing the operating rate of the game center, or the player's fancy for games depending on the time. Furthermore, the prior art monolithically judges a game machine to which a game program is to be transferred, based on the operating rate and so on. As a result, it has been found that in fact, the operating rate of the game center could not be improved as expected.

DISCLOSURE OF THE INVENTION

It is therefore an objective of the present invention to provide a game system and information storage medium which can improve the operating rate of a game center to make its management more effectively.

To this end, the present invention provides a game system including a plurality of game machines each of which has at least operating means and display means and is used to play a game by a player, and a host machine for performing data transfer with the game machines, wherein the host machine comprises:

timepiece means for detecting at least one of the current time and date;

means for performing allocation of a plurality of games to the game machines based on at least one of the detected current time and date; and means for transferring transfer data for a player to play a game by means of each of the game machines, the transfer data being transferred to each of the game machines according to the set allocation.

According to the present invention, the allocation of games to the game machines is carried out based on the detected current time or date. Thus, the allocation of games can be varied according to time periods or date without replacement of game machines. As a result, the present invention can provide optimum allocation of games based on time periods, date, player's type and so on.

The host machine may further comprise means for enabling a manager to set schedule data representing how the allocation is carried out according to at least one of the time and date; and the allocation of games to the game machines may be carried out based on at least one of the detected current time and date, and according to the schedule data. Thus, the manager can allocate the games to the game machines according to the desired schedule. As a result, the manager can more effectively manage the game center.

The present invention further provides a game system including a plurality of game machines each of which has at least operating means and display means and is used to play a game by a player, and a host machine for performing data transfer with the game machines, wherein the host machine comprises:

means for performing processing for enabling a manager to set allocation of a plurality of games to the game machines; and means for transferring a transfer data for a player to play a game by means of each of the game machines, the transfer data being transferred to each of the game machines according to the set allocation.

According to the present invention, the manager can desirably allocate the games to the game machines. As a result, the optimum allocation of games to the game machines can easily and simply be realized considering the location of the game center, player's type, player's traffic line and so on, without replacement of the game machines.

The allocation of a plurality of games to the game machines may be varied according to time periods. Thus, the game center can more effectively be managed based on time periods.

The allocation of a plurality of games to the game machines may be varied according to the date. Thus, the game center can more effectively be managed based on the date (e.g., depending on whether it is week day or holiday).

The allocation of a plurality of games to the game machines may be varied according to a traffic line of a player. Thus, the optimum allocation can be realized considering the traffic line of player.

A player may be enabled to play a dedicated game only in a specified time period. Thus, it can be easily inhibited that a dedicated game is played out of the specified time period.

The host machine may set at least one of game sound volume and screen brightness in each of the game machines. Thus, the game sound volume or screen brightness can be changed for each game machine. This makes the management of the game center or the other more effective.

BRIEF DESCRIPTION OF THE DRAWINGS

FIGS. 4A, 4B, 4C and 4D illustrate a technique of varying the allocation of games according to time periods or date.

FIG. 8 is a flow chart illustrating the detailed process of this embodiment.

FIG. 9 is a flow chart illustrating the detailed process of this embodiment.

BEST MODE FOR CARRYING OUT THE INVENTION

The present invention will now be described by way of example with reference to the drawings.

1. Configuration

Figure 1:
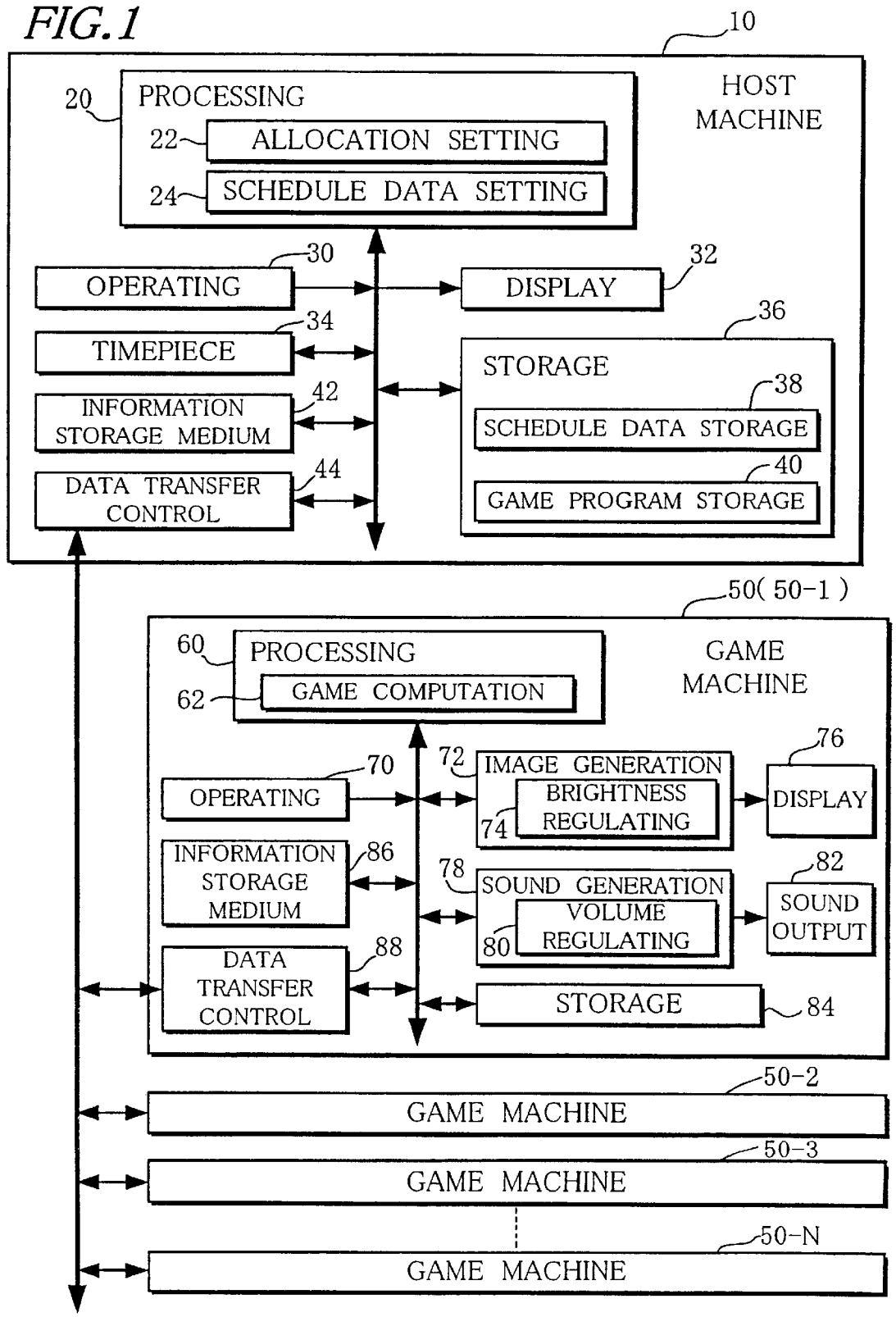
FIG. 1 is a block diagram of a game system constructed according to one embodiment of the present invention.

FIG. 1 shows one configuration of a game system according to the present invention.

A host machine 10 comprises a processing section 20, an operating section 30, a display section 32, a timepiece section 34, a storage section 36, an information storage medium 42 and a data transfer control section 44.

The processing section 20 performs various types of processing, such as controlling the entire host machine 10, issuing of instructions to various blocks in the host machine 10, and managing game machines 50-1 to 50-N connected to the host machine 10. The function of the processing section 20 may be realized by a structure of hardware such as CPU (CISC type or RISC type), DSP, ASIC (gate array or the like) or the like or according to a given program.

The operating section 30 is designed to cause a manager or the like in a game center to set various data such as schedule data and others. The display section 32 is designed to display a setting screen for setting various data to the manager.

The timepiece section 34 is designed to detect the current time or date and has timepiece and calendar functions.

The storage section 36 functions as a working area for the processing section 20, data transfer control section 44 and other sections. The function thereof may be realized by a structure of hardware such as RAM or the like.

The storage section 36 includes a schedule data storage section 38 which is designed to store schedule data representing how the allocation is carried out according to the time or date. The storage section 36 also includes a game program storage section 40 which is designed to store a plurality of game programs executed in the game machines 50-1 to 50-N.

The information storage medium 42 stores various types of information such as programs, data and so on. The function thereof may be implemented by hardware such as optical disc (CDROM or DVD), magneto-optical disc (MO), magnetic disc, hard disc, magnetic tape, semiconductor memory or the like. This information storage medium 42 stores information for implementing this embodiment (such as information for setting the allocation of games to the game machines based on at least one of the detected current time or date, or information for transferring the transfer data for causing a player to play a game to each of the game machines according to the set allocation).

The information stored in the information storage medium 42 contains at least one of program codes, image information, sound information, shape information of display objects, table data, list data, player's information and so on, all for performing the processing of this embodiment. All or part of the information stored in the information storage medium 42 will be transferred to the storage section 36 when the game machine is powered on or at any other time.

The data transfer control section (or communication controller) 44 is designed to perform various controls for making data transfer between the game machines 50-1 to 50-N. The function thereof may be realized by a structure of hardware such as data transferring ASIC, CPU or the like or according to a given program (or data transferring program).

Each of the game machines 50 comprises a processing section 60, an operating section 70, an image generation section 72, a display section 76, a sound generation section 78, a sound output section 82, a storage section 84, an information storage medium 86 and a data transfer control section 88.

The processing section 60 is designed to perform various types of processing, such as controlling all the game machines 50, issuing instructions to various blocks in each game machine 50, and executing game computation. The functions of the processing section 60 can be implemented by hardware such as CPU, DSP, or ASIC, or by a given program (or game program).

The processing section 60 includes a game computation section 62 executes various types of game computation, such as: processing for setting a game mode; processing for moving the game forward; processing for determining the position and direction of s movable body; processing for determining viewpoint and line-of-sight direction; hit check processing; and processing for calculating game score (results).

The operating section 70 is designed to enable a player to input operational data. The function thereof may be realized through structures of hardware such as levers, buttons, gun, steering wheel, accelerator pedal, braking pedal and others.

The image generation section 72 is designed to generate and output various images toward the display section 76 according to commands from the processing section 60. The function thereof may be realized by a structure of hardware such as image generation ASIC, CPU, DSP or the like or according to a given program (or image generation program). The image generation section 72 includes a brightness regulating section 74 which is designed to regulate the brightness on the screen in the display section 76.

The sound generation section 78 is designed to generate and output various sounds toward the sound output section 82 according to commands from the processing section 60 or the other. The function thereof may be realized by a structure of hardware such as sound generation ASIC, CPU, DSP or the like or according to a given program (or sound generation program). The sound generation section 78 includes a volume control section 80 which is designed to control the volume of the game sounds outputted from the sound output section 82.

The storage section 84 functions as a working area for the processing section 60, image generation section 72, sound generation section 78, data transfer control section 88 and so on. The function thereof may be realized by a structure of hardware such as RAM.

The information storage medium 86 is to store information of program, data and so on. The function thereof may be realized by a structure of hardware such as IC card (memory card), optical disc, magneto-optical disc, hard disc or the like.

The data transfer control section 88 is designed to perform various controls for making data transfer between the game machine and the host machine 10. The function thereof may be realized by a structure of hardware such as data transferring ASIC, CPU or the like or according to a given program (or data transfer program).

Figure 2A:
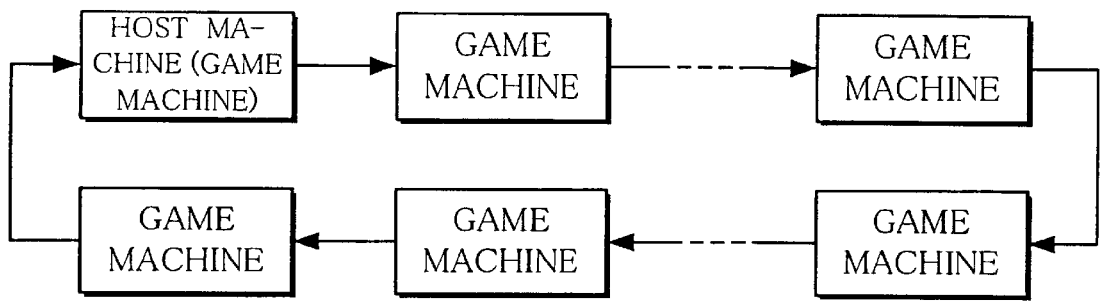
FIGS. 2A, 2B, 2C and 2D show various arrangements of the game system.
Figure 2B:
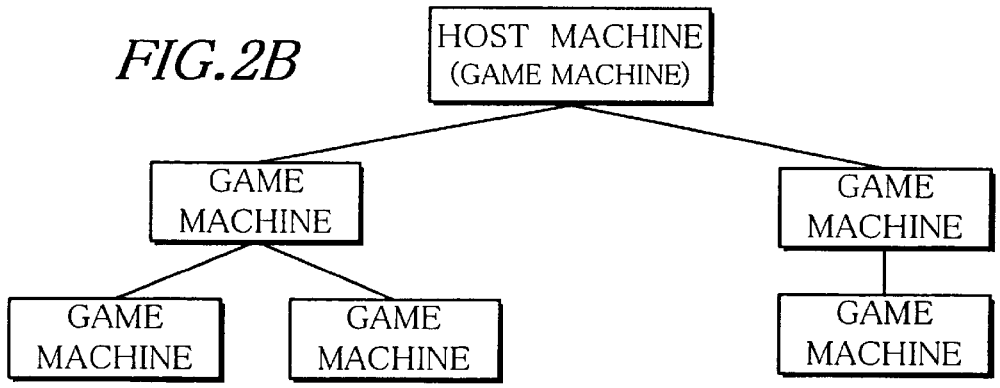
Figure 2C:
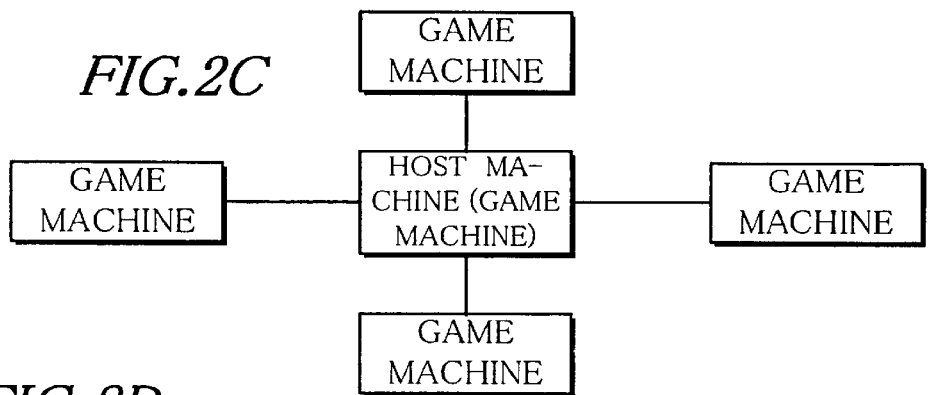

Although the use of such a game system as shown in FIG. 1 is preferable, the present invention is not limited to such arrangement. For example, the connection between the host machine and the game machines may take any of ring, tree and star types as shown in FIGS. 2A, 2B and 2C. For example, if the host machine is to be connected with the game machines through IEEE1394 or USB, it is desirable to use the tree type connection as shown in FIG. 2B. Any one of the game machines to be connected may be used as the host machine.

Figure 2D:
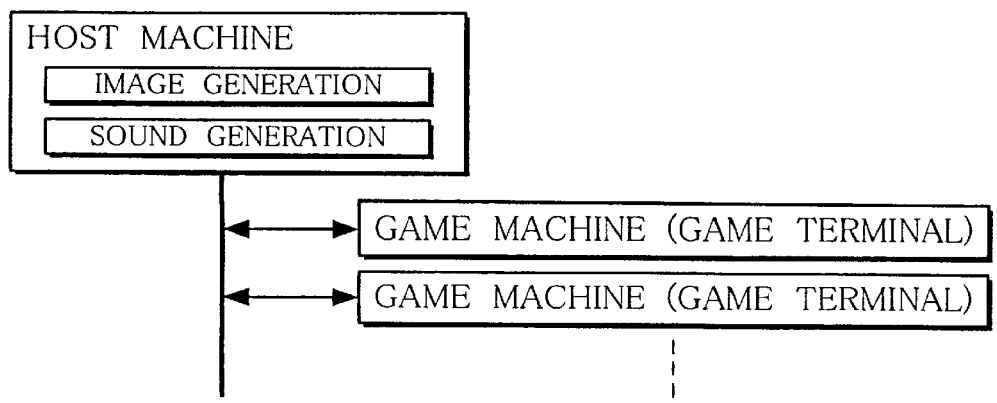

Furthermore, the host machine may include image and sound generation sections which generate images and sounds to be transmitted to the game machines, as shown in FIG. 2D. In such a case, the game machines will simply function as game terminals.

2. Feature of This Embodiment

The feature of this embodiment is to set an allocation of games to the game machines 50-1 to 50-N, based on the current time or date that is detected by the timepiece section 34. This setting of allocation may be carried out by an allocation setting section 22, for example. A transfer data for a player to play each of the games in each of the game machines 50-1 to 50-N (e.g., a game program) will be transferred from the data transfer control section 44 to the corresponding one of the game machines 50-1 to 50-N according to the set allocation. This enables the allocation of games to the game machines 50-1 to 50-N to be varied according to time periods or date, without replacement of the game machines 50-1 to 50-N. Therefore, the optimum allocation of games can be realized based on time periods, date and player's type, thus improving the operating rate in the game center.

In this case, it is desirable that the schedule data representing how the allocation is carried out according to the time or date may be set by the manager or other in the game center. The setting of schedule data may be realized by a schedule data setting section 24 included in the processing section 20. Thus, the optimum allocation may be set by the manager in the game center based on time periods or date. As a result, the game center can more be activated to improve the operating rate and can more effectively be managed.

The allocation of games to the game machines 50-1 to 50-N may be set by the manager, rather than based on the current time or date that is detected by the timepiece section 34.

Figure 3:
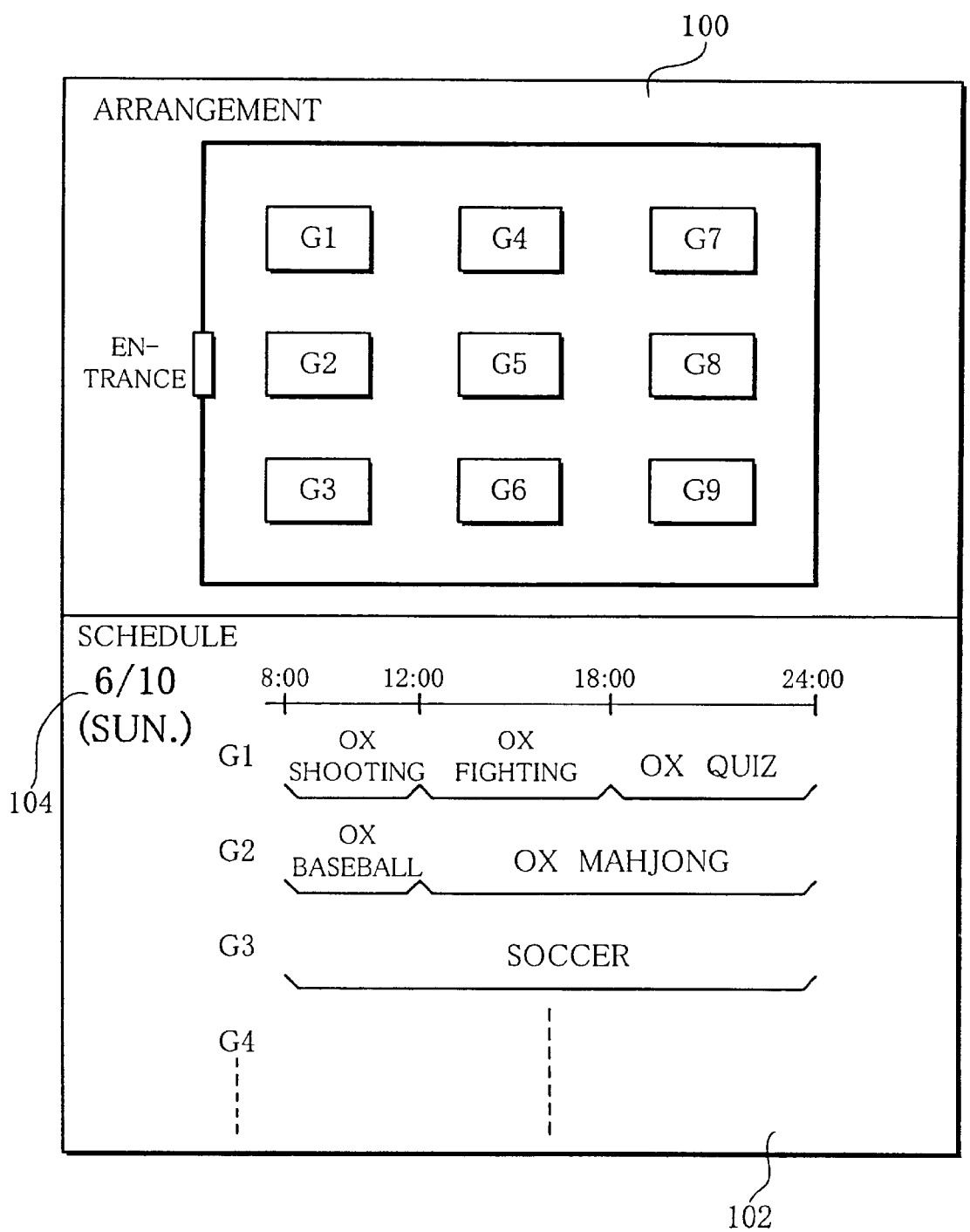
FIG. 3 shows a screen for setting schedule data.

FIG. 3 shows a setting screen for setting the schedule data. The manager in the game center may manipulate the operating section 30 to set the schedule data while viewing this screen displayed on the display section 32 of FIG. 1. Referring to FIG. 3, a screen 100 shows allocation of game machines G1 to G9. A scheduling screen 102 is used by the manager to input a schedule of the allocation of games to the game machines G1 to G9. In one of the game machines G1, for example, a program of shooting game may be executed in a time period from 8:00 to 12:00; a program of fighting game in a time period from 12:00 to 18:00; and a program of quiz game in a time period from 18:00 to 24:00. A player will be able to play one of these games in the corresponding time period. In another game machine G2, for example, a program of baseball game may be executed in a time period from 8:00 to 12:00; and a program of mahjong game may be executed in a time period from 12:00 to 24:00. Thus, a player can play one of these games in the corresponding time period.

According to this embodiment, thus, the manager in the game center can set the allocation in which any desired game can be allocated to any desired game machine according to any desired schedule. Therefore, the allocation of games to the game machines may be realized based on the location of the game center, time periods or player's type. When many popular games are allocated to the game machines based on the location, time periods or player's type, the operating rate in the game center can be increased.

In this embodiment, the allocation of games to the game machines varied according to time periods. In general, young people mainly visit the game center in the daytime. In the daytime, therefore, more games for young people (e.g., shooting games, action games, fighting games and so on) may be allocated to the game machines, as shown FIG. 4A. On the other hand, adults on their way homes mainly visit the game center in the nighttime. Therefore, more games for adults (e.g., sports games, mahjong games, card games and so on) may be allocated to the game machines in the nighttime, as shown in FIG. 4B. When the allocation of games to the game machines depends on time periods in this manner, the optimum allocation of games may be realized. The game center can more be activated to improve the operating rate. In the past, it was substantially impossible to change the physical arrangement of game machines (or to replace game machines), based on time periods. According to this embodiment of the present invention, however, the allocation of games to the game machines can be varied according to time periods, without replacement of the game machines.

In this embodiment, the allocation of games to the game machines depends on whether it is weekday or holiday (or date in a broad sense). On weekdays, students having time to spare mainly visit the game center. On weekdays, therefore, more games for students (or people having time to spare) (e.g., racing games, robot fighting games, role playing games and so on) are allocated to the game machines, as shown in FIG. 4C. On the other hand, on holidays, families and couples mainly visit the game center. Therefore, more games for families and couples (e.g., electric-train games, quiz games, puzzle games and so on) are allocated to the game machines, as shown in FIG. 4D. In such a manner, the allocation of games to the game machines depends on whether it is weekday or holiday. Thus, the optimum allocation of games can be done. This more activates the game center to improve the operating rate thereof. In addition, for example, the arrangement may be set to provide more soccer games if there is a professional soccer game in the real world.

Figure 5:
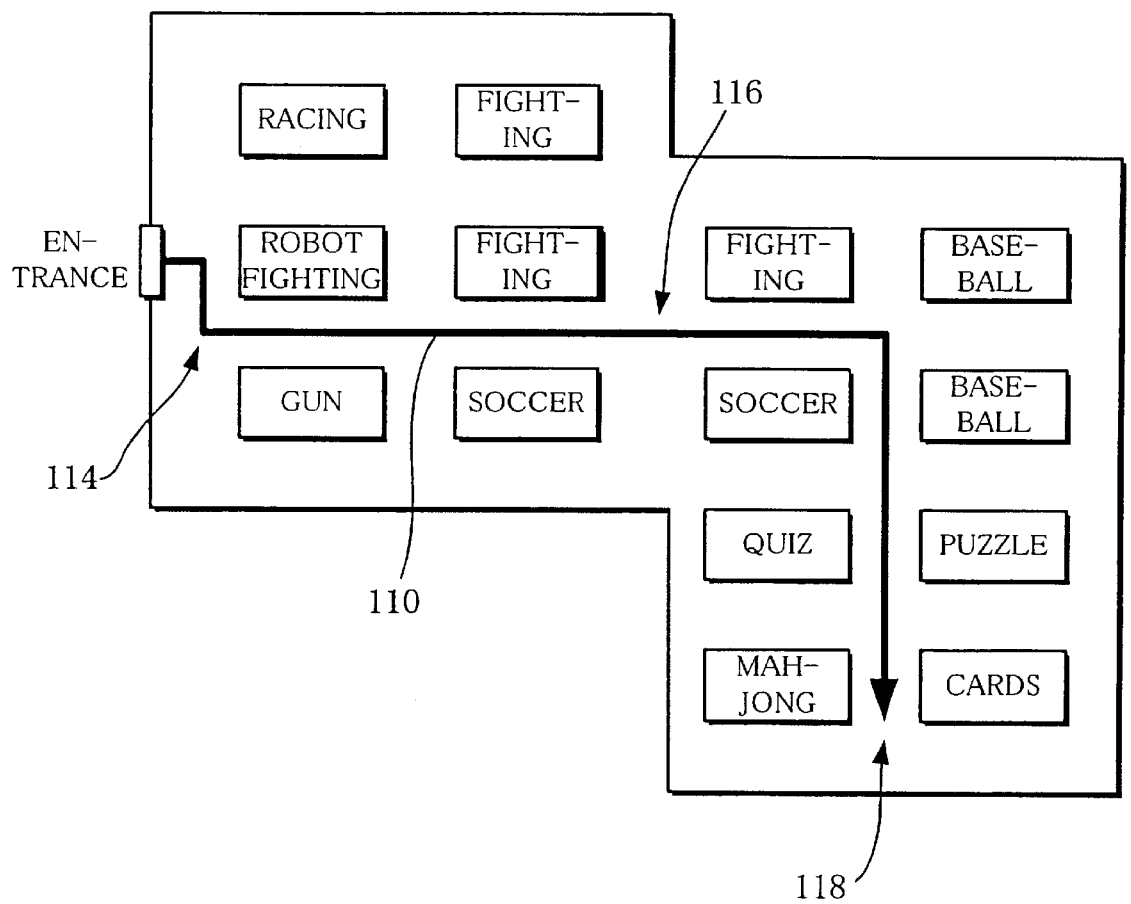
FIG. 5 illustrates a technique of varying the allocation of games based on the traffic line of player.

As shown in FIG. 5, the allocation of games to the game machines is varied according to the traffic line 110 of players. At a location 114 near the entrance of the game center, more attractive, latest or popular games (e.g., racing games, robot fighting games, gun games and so on) are provided. Thus, more people may be attracted to the game center, improving the image of the game center.

At an intermediate location 116 from the entrance of the game center, standard games which are popular among many visitors (e.g., fighting games, soccer games, baseball games and so on) are provided. Such standard games can be expected to be played by many players regardless of the location. As many visitors move from the location 114 to the other location 116 along the traffic line 110, they necessarily view the games being played at the location 114. This provides effective advertisement for the games being played at the location 114.

At the farthest location 118 from the entrance of the game center, games which are not explosively popular but have a steady following, or games which people want to play in calm circumstances (e.g., quiz games, puzzle games, mahjong games, card games and so on) are be provided. This can effectively avoid such a disadvantage that the operating rate of the game center will be reduced by less visitors playing the games at the farthest location 118 from the entrance of the game center. As the visitors desiring a game play at the location 118 move from the location 114 to the location 116 or 118 along the traffic line 110, the visitors will necessarily view the games being played at the locations 114 and 116. This provides effective advertisement for the games being played at the locations 114 and 116.

This embodiment of the present invention enables a player to play a dedicated game only in a specified time period. For example, in a game shown in FIG. 6A, a primitive surface (including polygon, curved surface or the like) 124 in a cover object 122 covering a character object 120, is removed (or disappears from display, is transparentized, or the like) based on whether or not a condition of game clear is satisfied. After the primitive surface 124 has been removed, a player can see a portion of the character object 120 hidden by the primitive surface 124. In such a case, the game clear condition for removing the primitive surface 124 may by satisfied by finishing the mahjong game, by clearing one stage in the action game or by correctly answering the quiz game. The image portion viewed when the primitive surface 124 is removed may be one pleasured by the adult. In the viewpoint of education, such a game should not be played by children.

Figure 6A:
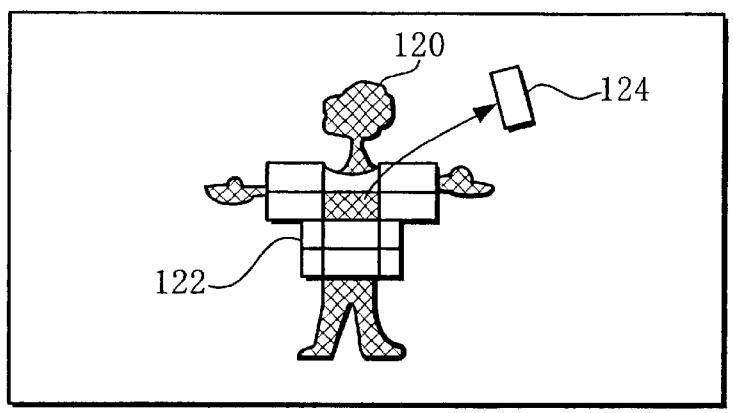
FIGS. 6A, 6B and 6C illustrate a technique of enabling a player to play a dedicated game only in a specified time period.
Figure 6B:
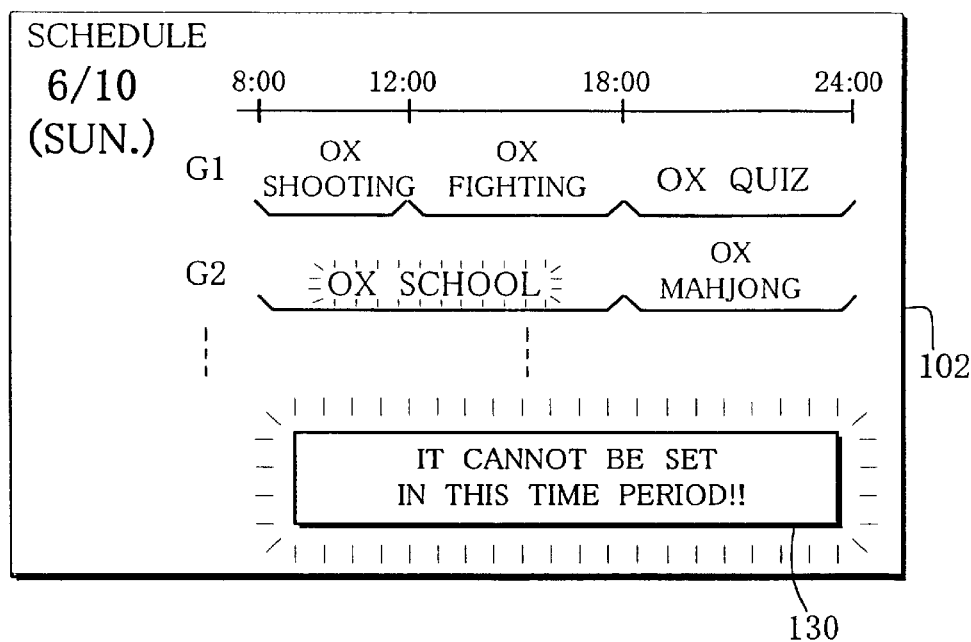

For the last-mentioned purpose, this embodiment may further be designed to provide a warning 130 if such an adult game as shown in FIG. 6A is to be scheduled in the daytime on the scheduling screen 102, as shown in FIG. 6B. This can inhibit children to play the adult game of FIG. 6A. On the other hand, the warning 130 will not be displayed even if the adult game of FIG. 6A is to be scheduled in the nighttime. Thus, the adult game of FIG. 6A may be enjoyed by adults in the nighttime.

Figure 6C:
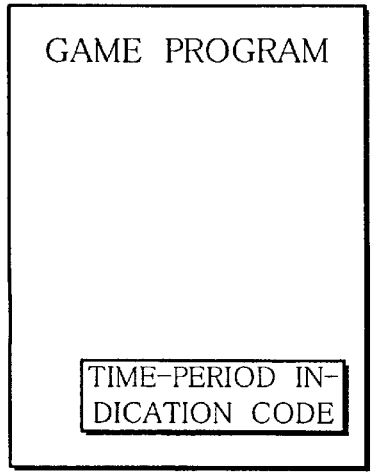

In order to display such a warning 130 as shown in FIG. 6B, the game program may contain a time period indication code, as shown in FIG. 6C. It may be determined whether or not the warning 130 should be displayed based on this time period indication code.

The technique of enabling any dedicated game only in a specified time period is not limited to those of FIGS. 6B and 6C. For example, the program of dedicated game for a specified time period may not be transferred from the host machine to the game machines in any time out of that spedified time period. Alternatively, the host machine may inhibit that any program of dedicated game for adult is executed in each of the game machines in a specified time period.

Figure 7A:
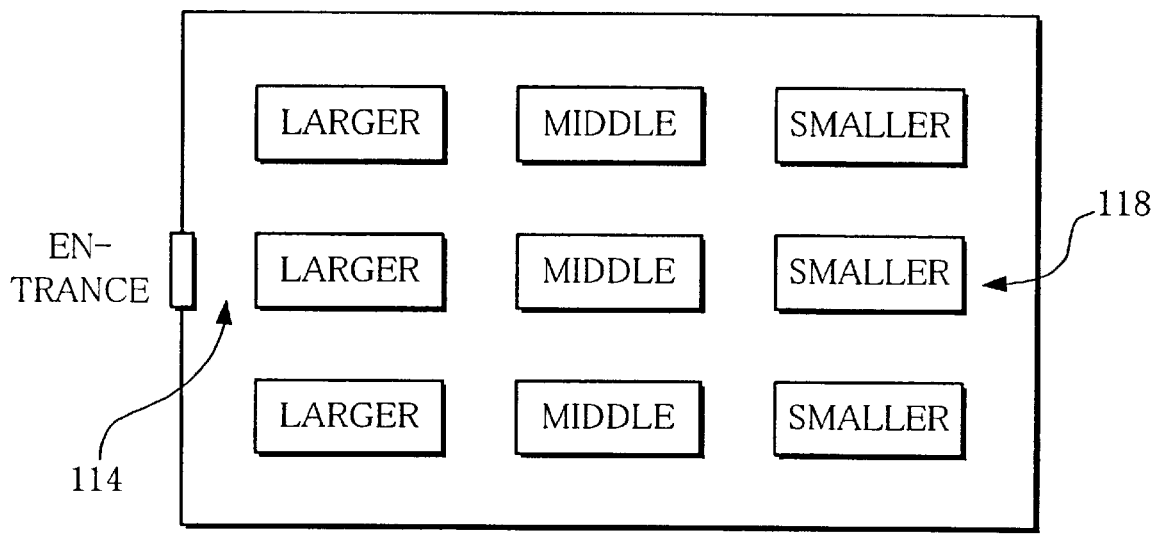
FIGS. 7A and 7B illustrate a technique of setting the game sound volume and screen brightness for the game machines.
Figure 7B:
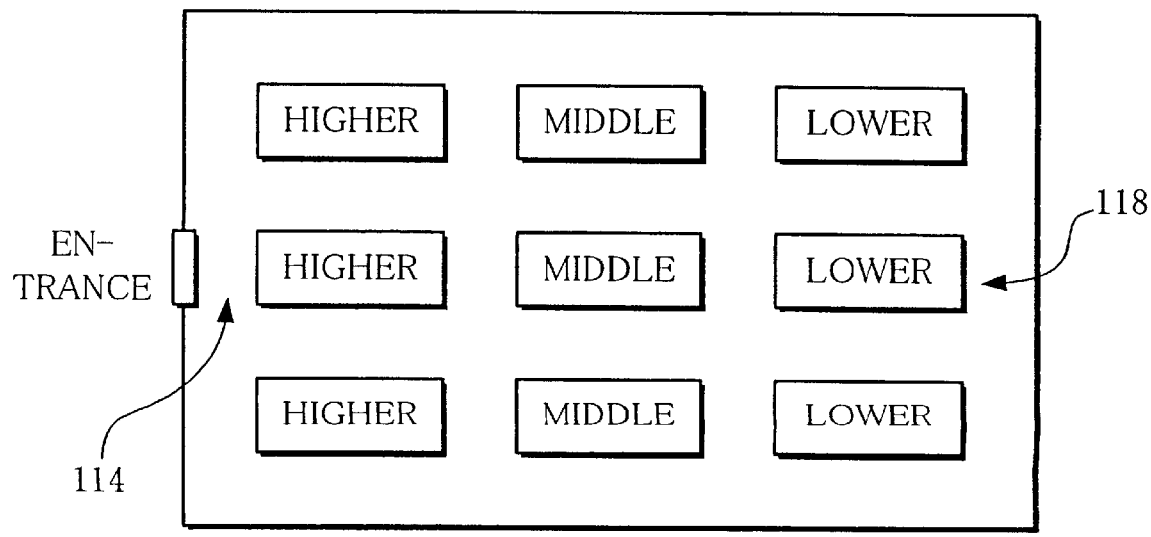

According to this embodiment, the host machine can set the game sound volume or screen brightness in each of the game machines. As shown in FIGS. 7A and 7B, for example, the sound volume and brightness may be increased in the game machines at the location 114 near the entrance of the game center. This may attract more people to the game center. This may also make the atmosphere of the game center more busy and florid, thereby providing a more effective management for the game center.

On the other hand, the game machines located at the farthest location 118 from the entrance of the game center may be reduced in volume and brightness. The atmosphere in the farthest location 118 may be made relatively calm and adult to satisfy players desiring a calm and adult circumference.

The sound volume and/or screen brightness in each of the game machines may be changed based on the time or date. For example, the sound volume and screen brightness may be increased in the daytime. This can make the game center more busy and florid to attract the young people and students to the game center. On the other hand, the sound volume and screen brightness may be reduced in the nighttime. This can make the atmosphere of the game center more calm and classy to attract more adults and women to the game center.

It is desirable that the sound volume and screen brightness may be set by the manager when the game programs to be executed in certain time periods are inputted through the scheduling screen 102 of FIG. 3.

The detailed process of this embodiment will be described in connection with FIGS. 8 and 9.

FIG. 8 is a flow chart illustrating the setting of schedule data.

First of all, the manager in the game center uses the setting screen of FIG. 3 to specify the date 104 (step S1). In this case, merely the weekday or holiday may be specified rather than the current date.

The manager then specifies one of the game machines (step S2). As in FIG. 3, the first game machine G1 may be specified. The manager subsequently specifies the time period and game (steps S3 and S4). As in FIG. 3, a shooting game may be specified for the game machine G1 in the time period from 8:00 to 12:00. The manager will specify the time period and the game considering which game is popular in which time period.

Subsequently, the game system checks the time period indication code (see FIG. 6C) contained in the program of the game specified by the manager (step S5). It is then determined whether or not the time period specified at the step S3 (or the scheduled to execute the specified game) is out of the time period indicated by the time period indication code (step S6). If it is out of the time period indicated by the code, the warning 130 is displayed as shown in FIG. 6B (step S7) and the procedure returns to the step S3. In this case, the player will retry to specify the time period and game.

The sound volume and screen brightness are then specified (steps S8 and S9). This can set the sound volume and screen brightness in each of the game machines or change them based on the time or date, as shown in FIGS. 7A and 7B.

It is then determined whether or not the specifying of game has been carried out for all available time periods (step S10). If not, the procedure returns to the step S3 wherein the specifying of game will be performed for the next time period. In FIG. 3, a fighting game is specified for a time period from 12:00 to 18:00. If the game has been specified, it is then determined whether or not all the game machines have been specified (step S11). If not, the procedure returns to the step S2 wherein the next game machine will be specified. In FIG. 3, the second game machine G2 next to the first game machine G1 is specified. On the other hand, if all the game machines have been specified, the specified schedule data is registered in the schedule data storage section 38 shown in FIG. 1 (step S12). In such a manner, schedule data for every date will be registered.

FIG. 9 is a flow chart illustrating the allocation of games through the host machine.

First of all, the timepiece section 34 of FIG. 1 detects the current date and time (step T1). Based on the detected date and time, the schedule data registered in the schedule data storage section 38 is referred to (step T2). It is then determined whether or not any game exchange is scheduled (step T3). If not, the procedure returns to the step T1. In the example shown in FIG. 3, it is determined that no exchange of the game is scheduled until 12:00.

If it is determined that the game exchange is scheduled at that time, a game program to be transferred and a game machine which receives the game program are determined (steps T4 and T5). In FIG. 3, it is determined that the program of shooting game is transferred to the game machine G1. The sound volume and screen brightness are then determined (steps T6 and T7). The sound volume and screen brightness have been specified at the steps S8 and S9 in FIG. 8. The game program determined at the step T5 and data for setting the sound volume and screen brightness determined at the steps T6 and T7 are then transferred to the game machine determined at the step T4 (step T8). This data transfer is carried out under control of the data transfer control section 44 in FIG. 1.

It is then determined whether or not there is any other game machine which is scheduled to exchange the game at that time (step T9). If any other game machine is scheduled to exchange the game, the procedure returns to the step T4 wherein that game machine is determined to be a game machine to which data transfer is carried out. In FIG. 3, since the game machine G2 is also scheduled to exchange the game at 12:00, as well as the game machine G1, the successive steps T4 to T8 are carried out for the game machine G2. On the other hand, if there is no game machine that is scheduled to exchange the game, the procedure returns to the step T1.

The present invention is not limited to the aforementioned forms, but may be carried out in any of various other forms.

This embodiment has been described as to the game system in which the host machine transfers game programs to the game machines in which these game programs will be executed. However, the present invention is not limited to such an arrangement. As shown in FIG. 2D, for example, the host machine may execute a game program while the game machine may merely function as game terminals for outputting images and sounds.

This embodiment has been described as to the allocation of games to the game machines which is performed based on time periods, date (weekday or holiday) or the traffic line of players. However, the present invention is not limited to such a form, but may similarly be applied to any of various other allocations performed based on various other factors.

The host and game machines may not necessarily be arranged within the same game center. The host machine may perform the data transfer between the host machine and the game machines through a remote communication.

What is claimed is:

1. A game system including a plurality of game machines each of which has at least operating means and display means and is used to play a game by a player, and a host machine for performing data transfer with said game machines, wherein said host machine comprises:

timepiece means for detecting at least one of the current time and date;

means for setting allocation of a plurality of types of games to said game machines based on at least one of the detected current time and date; and means for transferring transfer data for a player to play a game by means of each of said game machines, said transfer data being transferred to each of said game machines according to the set allocation.

2. The game system as defined in claim 1, wherein said host machine further comprises means for enabling a manager to set schedule data representing how the allocation is carried out according to at least one of the time and date, wherein the allocation of games to said game machines is carried out based on at least one of the detected current time and date, and according to the schedule data.

3. The game system as defined in claim 1, wherein the allocation of a plurality of games to said game machines is varied according to time periods.

4. The game system as defined in claim 1, wherein the allocation of a plurality of games to said game machines is varied according to the date.

5. The game system as defined in claim 1, wherein the allocation of a plurality of games to said game machines is varied according to a traffic line of a player.

6. The game system as defined in claim 1, wherein a player is enabled to play a dedicated game only in a specified time period.

7. The game system as defined in claim 1, wherein said host machine sets at least one of game sound volume and screen brightness in each of said game machines.

8. A game system including a plurality of game machines each of which has at least operating means and display means and is used to play a game by a player, and a host machine for performing data transfer with said game machines, wherein said host machine comprises:

means for performing processing for enabling a manager to set allocation of a plurality of types of games to said game machines; and means for transferring a transfer data for a player to play a game by means of each of said game machines, said transfer data being transferred to each of said game machines according to the set allocation.

9. The game system as defined in claim 8, wherein the allocation of a plurality of games to said game machines is varied according to time periods.

10. The game system as defined in claim 8, wherein the allocation of a plurality of games to said game machines is varied according to the date.

11. The game system as defined in claim 8, wherein the allocation of a plurality of games to said game machines is varied according to a traffic line of a player.

12. The game system as defined in claim 8, wherein a player is enabled to play a dedicated game only in a specified time period.

13. The game system as defined in claim 8, wherein said host machine sets at least one of game sound volume and screen brightness in each of said game machines.

14. A computer-readable information storage medium used for a game system including a plurality of game machines each of which has at least operating means and display means and is used to play a game by a player, and a host machine for performing data transfer with said game machines, said information storage medium comprising:

information for setting allocation of a plurality of types of games to said game machines based on at least one of the detected current time and date; and information for transferring transfer data for a player to play a game to each of said game machines, said transfer data being transferred to each of said game machines according to the set allocation.

15. The information storage medium as defined in claim 14, wherein schedule data representing how the allocation is carried out according to at least one of the time and date is set, and wherein the allocation of games to said game machines is carried out based on at least one of the detected current time and date, and according to said schedule data.

16. The information storage medium as defined in claim 14, wherein the allocation of a plurality of game to said game machines is varied according to time periods.

17. The information storage medium as defined in claim 14, wherein the allocation of a plurality of games to said game machines is varied according to the date.

18. The information storage medium as defined in claim 14, wherein the allocation of a plurality of games to said game machines is varied according to a traffic line of a player.

19. The information storage medium as defined in claim 14, wherein a player is enabled to play a dedicated game only in a specified time period.

20. The information storage medium as defined in claim 14, wherein said host machine sets at least one of game sound volume and screen brightness in each of said game machines.

21. A computer-readable information storage medium used for a game system including a plurality of game machines each of which has at least operating means and display means and is used to play a game by a player, and a host machine for performing data transfer with said game machines, said information storage medium comprising:

information for performing processing for enabling a manager to set allocation of a plurality of types of games to said game machines; and information for transferring a transfer data for a player to play a game by means of each of said game machines, said transfer data being transferred to each of said game machines according to the set allocation.

22. The information storage medium as defined in claim 21, wherein the allocation of a plurality of games to said game machines is varied according to time periods.

23. The information storage medium as defined in claim 16, wherein the allocation of a plurality of games to said game machines is varied according to the date.

24. The information storage medium as defined in claim 21, wherein the allocation of a plurality of games to said game machines is varied according to a traffic line of a player.

25. The information storage medium as defined in claim 21, wherein a player is enabled to play a dedicated game only in a specified time period.

26. The information storage medium as defined in claim 21, wherein said host machine sets at least one of game sound volume and screen brightness in each of said game machines.

* * * * *